No. 618,896. Patented Feb. 7, 1899.
M. M. MURDEN.
POTATO BUG GATHERER.
(Application filed Mar. 12, 1898.)
(No Model.)
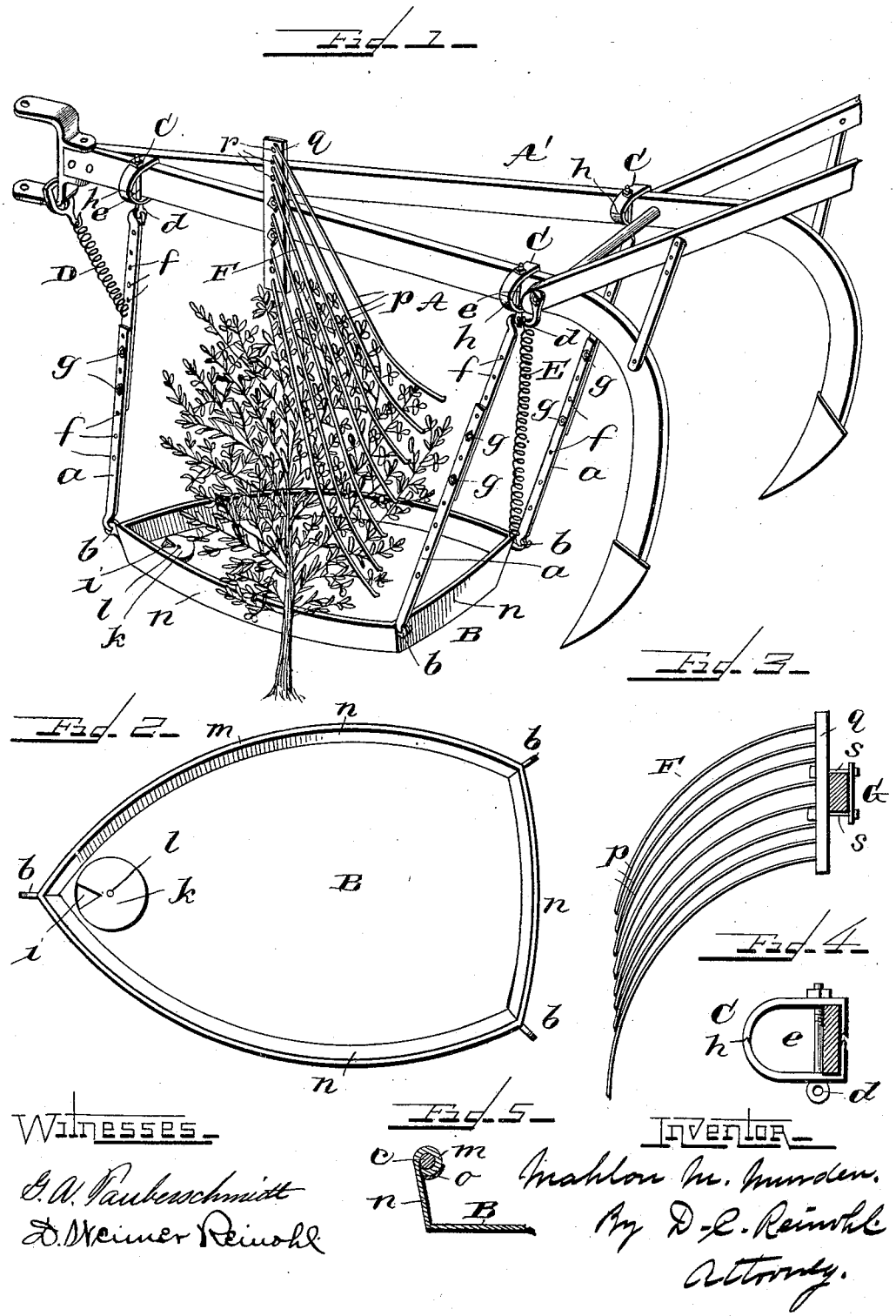

UNITED STATES PATENT OFFICE.

MAHLON M. MURDEN, OF LOGANSPORT, INDIANA.

POTATO-BUG GATHERER.

SPECIFICATION forming part of Letters Patent No. 618,896, dated February 7, 1899.

Application filed March 12, 1898. Serial No. 673,631. (No model.)

*To all whom it may concern:*

Be it known that I, MAHLON M. MURDEN, a citizen of the United States, residing at Logansport, in the county of Cass and State of Indiana, have invented certain new and useful Improvements in Potato-Bug Gatherers; and I do hereby declare the following to be a full, clear, and exact description of the invention, such as will enable others skilled in the art to which it appertains to make and use the same.

My invention relates to insect-gatherers used for removing potato-bugs from vines, has for its object the attachment of such a device to a cultivator, so that bugs may be removed from vines while the vines are being cultivated, and consists in certain improvements in construction, which will be fully disclosed in the following specification and claims.

In the accompanying drawings, which form part of this specification, Figure 1 represents a perspective of a cultivator provided with my improved potato-bug gatherer attached to one side thereof only; Fig. 2, a top plan view, on an enlarged scale, of the pan detached; Fig. 3, a side view of the brush or rake detached; Fig. 4, a side view of a clamp detached and on an enlarged scale; and Fig. 5, an enlarged section of the pan, showing the inwardly-overhanging top edge.

Reference being had to the drawings and the letters thereon, A A' indicate the beams of a cultivator, which may be of any approved form; B, a pan or receptacle to collect insects as they are displaced from vines or stalks. The pan is suspended from the beams of the cultivator by extensible rods $a$, connected to the pan at $b$ by eyes or loops formed in the wire $c$, and at their upper ends they are connected to the eye $d$ of the bolt $e$ of the clamps C. The rods $a$ are provided with registering perforations $f$ for adjusting the height of the pan, and the rods are then secured together by a suitable bolt $g$.

The clamps C are preferably made in two parts connected by a V-shaped joint $h$ on each side and the clamps secured to the beam of the cultivator by the bolt $e$, so that they may be readily applied and removed. In attaching the pan to a cultivator the front clamp and the outside rear clamp are attached to one beam A of the cultivator and the inner rear clamp is attached to the opposite beam A', as shown in Fig. 1.

D indicates a spring attached to the cultivator and to the front rod $a$, and E a spring attached to the cultivator and to the pan B at its rear and inner end for the purpose of holding the pan in proper relation to the row of vines to be treated and to restore the pan to its normal position when displaced by forcible contact with the vines, the spring D being set at an angle by its connection with beam A and the inner rear end of the pan, as shown in Fig. 1.

In the bottom of the pan B is an opening $i$ to discharge the bugs and is controlled by a valve $k$, pivotally secured thereto by a rivet $l$, and the upper edge of the pan is provided with an inwardly-overhanging rim $m$, formed by inclosing the wire $c$ in the edges of the flaring side or flange $n$ of the pan to prevent the bugs crawling out of the pan. As a further preventive of escape a coating of thick grease $o$ may be applied to the rim $m$, as shown in Fig. 5.

F indicates the brush or rake, which is provided with inwardly-curved fingers $p$, embedded in and secured to the bar $q$, and the bar is provided with a series of perforations $r$ for adjusting the brush vertically on the beam of the cultivator. The brush is secured to the beam by means of a clamp G and bolts $s\ s$ and may be adjusted to any desired height, according to the growth of the vines. The brush is adjusted upon the beam of the cultivator so that the fingers $p$ will pass through the branches of the vines and forcibly remove the bugs, which fall into the pan B.

It is my purpose to attach a gatherer to each side of the cultivator; but for the purpose of illustration and to avoid confusion of lines I have shown only one attached.

The pan B is curved or rounded on each side and brought to a point at its front end to avoid interference with the vines pushing it back or the pan breaking the vines, and by this form of construction the pans are interchangeable from one side to the other of the cultivator.

Having thus fully described my invention, what I claim is—

1. A potato-bug gatherer consisting of a pan contracted at its front end, provided with adjustable supports and means for attaching the supports to a cultivator, in combination with a cultivator and a brush extending laterally from the beam of the cultivator and having fingers to engage the branches of a vine.

2. In a potato-bug gatherer, a cultivator, a brush attached to the beam of the cultivator and having laterally-extending and downwardly-curved fingers, in combination with a pan suspended from the beams of the cultivator.

3. In a potato-bug gatherer, a cultivator, a pan having curved sides, a pointed front end and provided with adjustable supports connected to the beams of the cultivator, in combination with a brush adjustably secured to a beam of the cultivator and provided with laterally-projecting fingers constructed to pass through the branches of a vine.

4. In a potato-bug gatherer, a cultivator, a pan having flaring sides, an inwardly-overhanging top edge and a discharge-opening in its bottom adjustable supports and connections with the beams of the cultivator, in combination with a brush secured to the beam of the cultivator and extending laterally therefrom.

5. In a potato-bug gatherer, a cultivator, a pan suspended from the cultivator and provided with a spring at each end connected to the beams of the cultivator, in combination with a brush attached to a beam of the cultivator and extending laterally therefrom.

In testimony whereof I affix my signature in presence of two witnesses.

MAHLON M. MURDEN.

Witnesses:
RUFUS MAGEE,
I. N. CRAWFORD.